United States Patent [19]
Crisan et al.

[11] Patent Number: 6,125,457
[45] Date of Patent: Sep. 26, 2000

[54] NETWORKED COMPUTER SECURITY SYSTEM

[75] Inventors: Adrian Crisan, Cypress; Brant W. Jones, The Woodlands, both of Tex.

[73] Assignee: Compaq Computer Corporation, Houston, Tex.

[21] Appl. No.: 08/999,439

[22] Filed: Dec. 29, 1997

[51] Int. Cl.[7] .................................................. G06F 12/00
[52] U.S. Cl. ......................... 714/36; 709/225; 713/201
[58] Field of Search ............................. 712/1; 709/225, 709/229; 714/36; 713/201, 202

[56] References Cited

U.S. PATENT DOCUMENTS

| | | | |
|---|---|---|---|
| 4,799,153 | 1/1989 | Hann | 713/201 |
| 5,241,594 | 8/1993 | Kung | 380/4 |
| 5,349,643 | 9/1994 | Cox | 380/25 |
| 5,377,343 | 12/1994 | Yaezawa | 711/164 |
| 5,388,156 | 2/1995 | Blackledge, Jr. et al. | 380/4 |
| 5,421,006 | 5/1995 | Jablon et al. | 714/36 |
| 5,451,934 | 9/1995 | Dawson et al. | 340/825.31 |
| 5,506,961 | 4/1996 | Carlson | 713/200 |
| 5,533,125 | 7/1996 | Bensimon et al. | 380/4 |
| 5,537,540 | 7/1996 | Miller et al. | 714/38 |
| 5,590,199 | 12/1996 | Krajewski | 380/25 |
| 5,724,426 | 3/1998 | Rosnow | 380/25 |
| 5,727,146 | 3/1998 | Savoldi | 713/201 |
| 5,742,756 | 4/1998 | Dillaway | 713/200 |
| 5,826,015 | 10/1998 | Schmidt | 713/201 |
| 5,892,901 | 4/1999 | Landwehr | 713/200 |
| 5,919,257 | 7/1999 | Trostle | 713/200 |
| 5,983,273 | 11/1999 | White | 709/229 |

OTHER PUBLICATIONS

U.S. application No. 08/693,458, filed Aug. 7, 1996, P–1097, "Method and Apparatus for Secure Execution of Software" Patent No. 5,850,559.

"PCI Bus Power Management Interface Specification", Version 1.0, Jun. 30, 1997, PCI Local Bus, 65 pages.

"Network PC System Design Guidelines", by Compaq, Dell, Hewlett Packard, Intel and Microsoft Corporation, Version 1.0b, Aug. 5, 1997.

*Primary Examiner*—Eric Coleman
*Attorney, Agent, or Firm*—Conley, Rose & Tayon, P.C.

[57] ABSTRACT

A hardware security password mechanism that allows administrators to manage the passwords more easily by managing them centrally on a network rather than on an individual system. Further, each individual machine interacts with the network to allow the system administrator to lock down the hardware features without having any local, hardware-based password mechanisms.

24 Claims, 2 Drawing Sheets

NETWORKED COMPUTER SECURITY SYSTEM

BACKGROUND AND SUMMARY OF THE INVENTION

This application relates to computer networks, and more particularly to security systems on networked computers.

Background: Computer System Theft and Security

Theft of computer related equipment and parts is a major source of lost revenue for businesses and individuals, and will continue to rise unless businesses can employ a more secure-method for reducing the value of gray-market computer components.

Theft of small high-dollar components is relatively easy and attractive. For example, the dollar value per cubic foot is high for such components as high-density memory modules, microprocessors, advanced graphics cards, and hard disks. The need for efficient manufacturing means that handling cannot be totally secure. Thus, losses due to theft are a persistent concern. The increasing use of Plug-and-Play and hot-swapping component architectures have made component theft increasingly convenient for thieves.

Due to the constant miniaturization of computer systems, virtually all current portable computer systems can easily be picked up and carried away, and very easily hidden in a briefcase or other container. Because of this, theft of portable computer systems has also become a great problem. One particular concern with regard to the theft of entire systems is the security of the contents of the computer hard drive. Since the value of the information stored on a computer is often much greater than that of the computer itself, it is increasingly important to find ways to disable computer systems after they have been stolen. If the computer is disabled, it is much less likely that any confidential information will be revealed, and a disabled computer system is much less attractive to thieves.

Also, a personal computer system can currently be physically removed from a network and will continue to operate. The user may have to reinstall or reconfigure the unit and operating system, but there is nothing to prevent the unit from being stolen or removed from the owner's location and computer network.

Currently, theft deterrent systems typically consist of a lock, which physically attaches the computer chassis to a desk or other immovable object to prevent its removal. The computer case can also be locked to prevent unauthorized removal of components.

Today there is no theft deterrent which renders the unit useless if it is stolen. A padlock or a case lock does not lock the actual electronics of the motherboard. Therefore, if a thief takes the time to circumvent the physical locks, or if no locks are present, then the thief ends up with a perfectly usable computer system.

Background: Computer Passwords

Current computer systems may include both user and administrator password security mechanisms. These mechanisms can prevent unauthorized access to the system, to configuration management utilities, or to different system devices and I/O ports. However, these passwords reside on a local system and are difficult to manage by the administrators. Users forget their passwords and cannot get into their units anymore.

Also, if an administrator leaves the company, all administrator passwords that were set on all individual machines must be changed to prevent the previous administrator from sabotaging the network and the units.

Today, users can set Power-On-Passwords on their local machine. The power-on-password prevents an unauthorized user from gaining access to the unit. An administrator can also set a Setup Password on the local machine to supersede the user password or provide a higher level of security. The Setup Password also prevents users from gaining access to configuration utility functionality and modifying their hardware settings.

Disadvantages of Current Password Systems

There are several significant disadvantages to present password security methods. Removing the CMOS battery from the system can defeat setup and power-on passwords. Also, because these passwords currently reside on the local machine, they are difficult to manage. There are some tools today which allow an administrator to change the passwords on several machines on the network. However, these tools still require that a machine list be maintained, and that the administrator purchase expensive network management tools to administer the units.

Background: Digital Signatures

Digital signatures are used to provide message authentication. The sender, for example a software vendor or system administrator, uses his own private key to encrypt a "message digest," thereby "signing" the message. A message digest is a cryptographically strong one-way hash function. It is somewhat analogous to a "checksum" or CRC error checking code, in that it compactly represents the message and is used to detect changes in the message. Unlike a CRC, however, it is computationally infeasible for an attacker to devise a substitute message that would produce an identical message digest. The message digest gets encrypted by the sender's private key, creating a digital signature of the message. Various digital signature standards have been proposed, such as SHA2 or CMD5.

The recipient can verify the digital signature by using the sender's public key to decrypt it. This proves that the sender was the true originator of the message, and that the message has not been subsequently altered by anyone else, because the sender alone possesses the private key that made that signature. Forgery of a signed message is infeasible, and the sender cannot later disavow his signature.

These two processes (encryption and digital signatures) can be combined to provide both privacy and authentication by first signing a message with the sender's private key, then encrypting the signed message with the recipient's public key. The recipient reverses these steps by first decrypting the message with his own private key, then checking the enclosed signature with the sender's public key. In this way, the encrypted message cannot be read by anyone but the recipient, and it can only have been created by the sender.

Further background on digital signatures can be found, for example, in the following books, all of which are hereby incorporated by reference: Pfitzman, Digital Signature Schemes (1996); Grant, Understanding Digital Signature (1997).

Background: BIOS Functions

A Basic Input/Output System (BIOS) memory is a memory (typically small) which stores the basic software to provide for initial system setup and configuration, including a Power-On Self Test, and allows the system to load and execute subsequent programs. This configuration software must be available to the system when it is first started, so the BIOS memory must be non-volatile.

It is important to note that the BIOS system is loaded before any other programs, and that the computer system must complete the BIOS load process before any other operations can be performed by the computer. Since this is the case, if the system is shut down by the BIOS software, because of system error or otherwise, the computer system is effectively disabled.

Innovative Security Systems and Methods application discloses a new method and hardware security mechanism for portable or desktop computer systems. According to the disclosed method, when a computer system is started, it first verifies that it is connected to an authorized network. If it is, it then requires a username and password from the operator, and verifies these over the network. After verifying the network and user, the system completes its boot process and thereafter operates normally; if the network is not present or an incorrect user/password combination is entered, the system is disabled. This technique allows administrators to manage passwords more easily by managing them centrally on a network rather than on an individual system. Further, each individual machine interacts with the network to allow the system administrator to lock down the hardware features without having any local, hardware-based password mechanisms, and prevents the system from operating at all if it is not connected to the network.

The disclosed embodiments provide many specific advantages, which include:

Increased security of each node system by requiring a network to be present.

Increased security of each node system by requiring that it operate on a specific network or set of networks.

Increased security of each node system by requiring that login information be entered before the system is operable.

More efficient system administration by allowing user access to specific nodes to be centrally administered.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
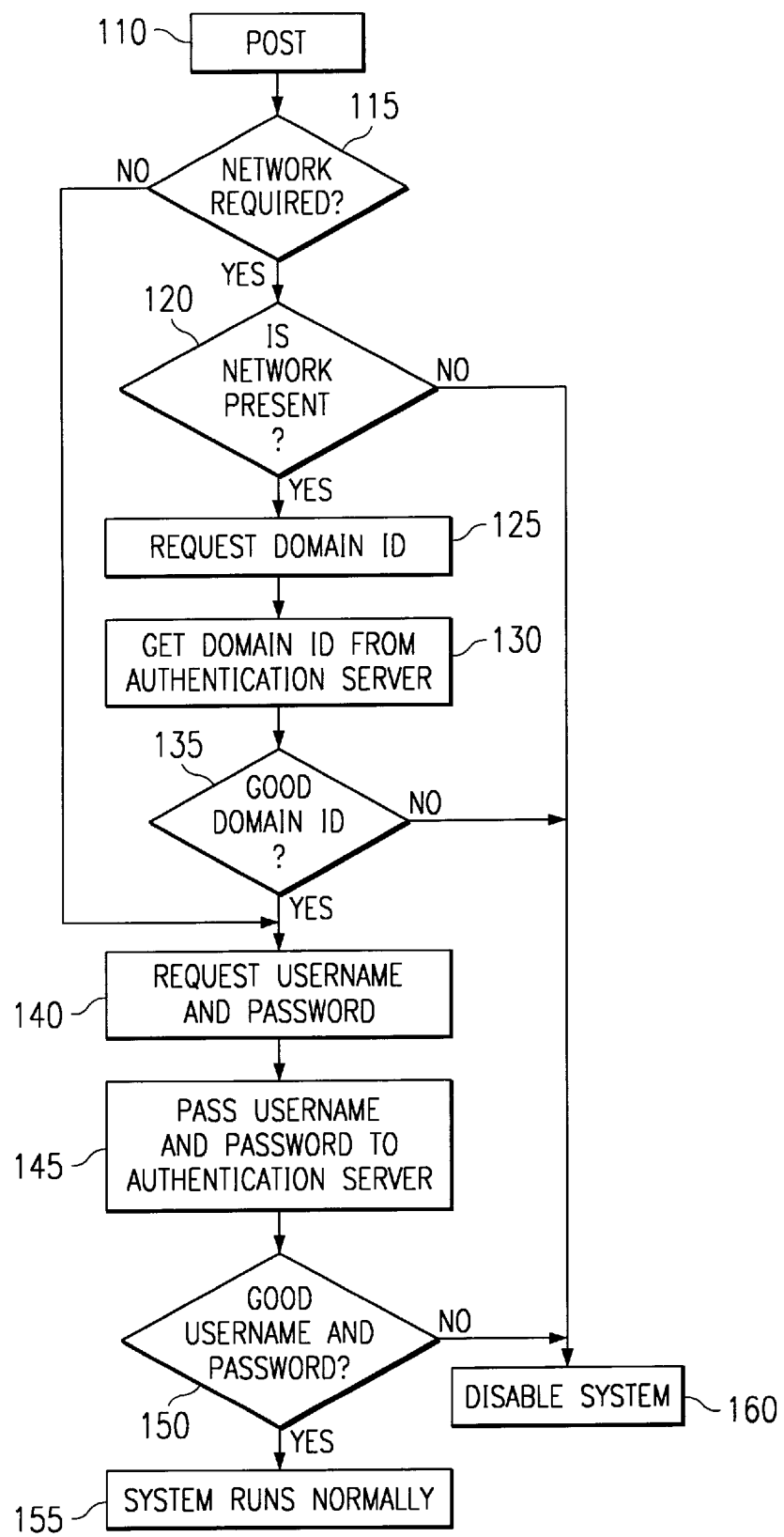
FIG. 1 shows a flowchart of the process of the presently preferred embodiment.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Current network environments (such as Windows NT Server) already maintain an authentication database with a username, password and privileges for users. According to the preferred embodiment, the hardware is locked using the same system routines as users currently use to log into their network. Further, each system on the network is rendered inoperable unless it is able to verify that it is connected to its assigned network. By combining these security measures, the preferred embodiment provides a complete security system which is easy to manage, yet provides theft deterring and security capabilities.

The preferred embodiment further deals with the security of the computer system itself by requiring, according to one optional security feature, a network-validated username and password before the system will function. Both the system and the network must be configured to do so. The computer is configured in such a way that a connection to a network is required for the PC to operate.

Additionally, the connection can be configured to be to a specific network (domain) by having utilities which verify the user and PC credentials against a database. This may be accomplished, for example, by installing a utility on the server which periodically broadcasts a "domain signature." The domain signature uniquely identifies the particular network, and can be a digitally encrypted signature. When the computer system is started, therefore, it will first determine if it is connected to a network, then "listen" to the network for the domain signature. If, and only if, the correct domain signature is received, the computer will be allowed to operate.

According the preferred embodiment, after the system has determined that it is in fact connected to a network, it will broadcast a request for the network domain ID, then listen for the domain signature. By broadcasting the request, the system saves time during its boot process over simply waiting for a domain signature to be sent.

The network must function to identify itself to each computer with an identifier that is unique to the network domain in which the computer resides. According to the preferred embodiment, this function is a utility which resides within the operating system network authentication services. Alternatively, it can be a standalone utility on the server or any system node that responds to network inquiries from the systems.

On each system of the network, an authentication circuit and non-volatile memory are used to enable or disable the system. Preferably this authentication circuit is implemented using a "black box" security controller chip, as described in the U.S. application 08/398,343, abandoned and refiled as 08/779,061, now U.S. Pat. 5,963,142 of Zinsky, Shaver, Kaiser and Rawlins, entitled "Security Control for Personal Computer" (filed Mar. 3, 1995), which is hereby incorporated by reference. The authentication circuit may also be implemented using an ASIC which contains flash memory. (Flash memory maintains its content even if the power and battery are removed.) In addition, each system uses a specialized set of BIOS functions. These functions allow BIOS to verify the network connection before the unit is booted. Recently standardized network boot protocols can be used to perform these functions, as described, e g. in Network PC System Design Guidelines, available from Microsoft Corp. and hereby incorporated by reference. The system may be disabled, when necessary, by disabling the motherboard of the system, the microprocessor, or other essential hardware.

The preferred method of the present application is described below, with reference to the block flowchart of FIG. 1:

1. When the system is started, it goes through its Power-On-Self-Test (POST) functionality, according to conventional processes (step 110). In addition, the system will check to see if it is connected to an authorized network:

a. When the computer is turned on, the BIOS program looks in the flash memory to determine if a bit was set to require that the computer is connected to a network (step 115). Only the administrator can set this bit, and it is preferable stored in a FLASH memory, so it is not erased when either the power or system battery are removed.

If the bit is not set, the computer does not require a network connection and the unit can operate whether or not it is connected to a network. Steps 120–135 are skipped (jump to step 140).

b. The BIOS program then communicates with the network controller to determine if the unit is actually connected to a network (step 120). If the unit is not connected to a network, the POST mechanism is terminated, an error message is displayed on the screen and the computer halts the boot process, therefore rendering itself useless (step 160).

c. If the BIOS program determines that the unit actually resides on a network, it then sends a broadcast message on the network asking for the unique domain ID (step 125). The utility (or network logon services) responds with an encrypted authentication message (step 130). A timeout value is required. If the utility does not respond within a specific amount of time, an error message is displayed on the screen and the computer does not continue to boot, therefore rendering itself useless (step 160).

d. If the utility responds with an encrypted unique domain ID, the BIOS program accepts this ID, sends it to the authentication circuit and waits for the authentication circuit to return an answer based on the value which was saved in it. This circuit performs the comparison between the stored value and the value sent to it by BIOS. (step 135)

e. If the value in the security controller and the domain ID are the same, the unit continues booting. If the values do not match, an error message is displayed on the screen and the computer does not continue booting (step 160).

2. Once the user needs to be authenticated, the BIOS asks the user to enter a username and password. (step 140)

3. The BIOS then uses the network boot protocols to authenticate the user on the domain by sending this information to an authentication server (step 145). The authentication server will indicate if the name and password are valid (step 150). If they are, the system then runs normally (step 155). If the authentication failed, the user cannot gain access to the system (step 190). In the authentication phase, the privileges of the user are also obtained. According to the preferred embodiment, if the user is an administrator in the domain, it is assumed that he/she is also an administrator for all hardware in the domain.

It is important to note that any event which triggers a hardware reset will launch the system into the POST process 110 which leads directly into steps 115–135. There are no branches out of this sequence which step 115–150. Thus, there is no way to escape the added security features.

According to less preferred embodiments, the computer network may employ only the network authentication system, or only the network-based password system, as described above. Each of these, even without the other, would provide significant security advantages. For example, the network authentication system, without the network password system, can still be used to ensure that a computer system could only be used on an authorized network, rendering it useless to thieves. Likewise, the network password system alone still provides considerable security, since it would only operate on a network which had a compatible server, and would require that the thief or unauthorized user actually enter a valid username and password.

According to an alternate embodiment, each system node provides or denies hardware access privileges in addition to the network privileges to ensure that users have access only to a particular unit, and cannot "log in to" and use any system unit in the enterprise. For example, the each username and password may be specifically linked to a certain node or group of nodes, and the user will be authenticated only if logging into an authorized node.

According to an alternate embodiment, each system node provides or denies access to specific hardware on each system according to the specific username and password entered. In this manner, the disclosed system and method allows the network administrator to control each user's access to the specific hardware of each node.

Figure 2:
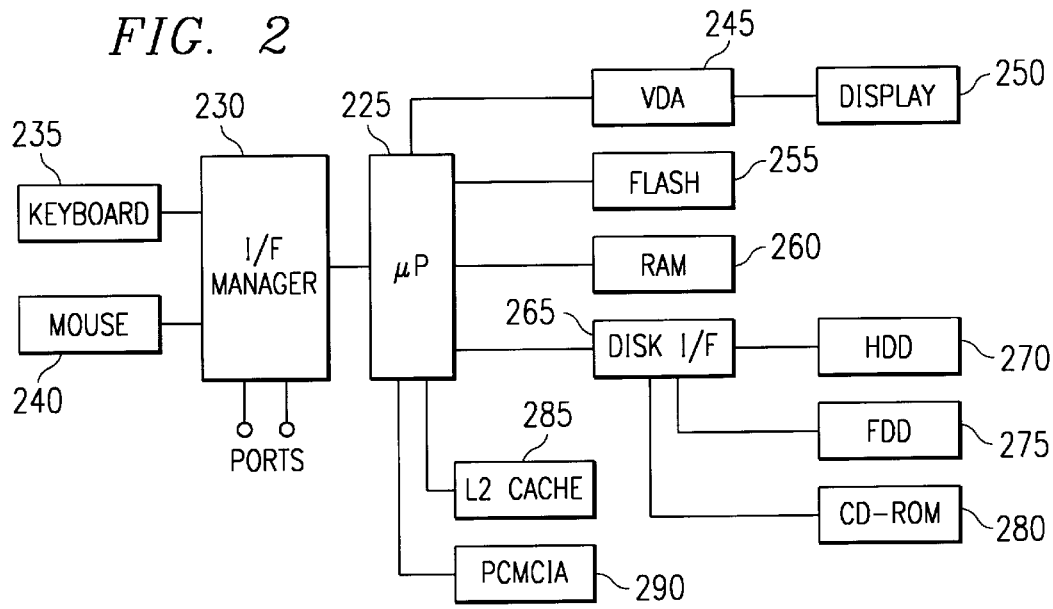
FIG. 2 shows a block diagram of a portable computer system according to the presently preferred embodiment.

FIG. 2 shows a block diagram of a computer system according to the presently preferred embodiment. A system such as this would function as a node on the network shown in FIG. 3 and would execute a process as described above at boot. The complete computer system includes, in this example:

user input devices (e.g. keyboard 235 and mouse 240);

a receiver for location data 220, capable of generating location data from, e.g., a geographic positioning service;

at least one microprocessor 225 which is operatively connected to receive inputs from said input device, through an interface manager chip 230 (which also provides an interface to the various ports) and from said receiver;

a memory (e.g. flash memory 255 and RAM 260), which is accessible by the microprocessor;

a data output device (e.g. display 250 and display driver card 245) which is connected to output data generated by microprocessor; and a magnetic disk drive 270 which is read-write accessible, through an interface unit 265, by the microprocessor.

Figure 3:
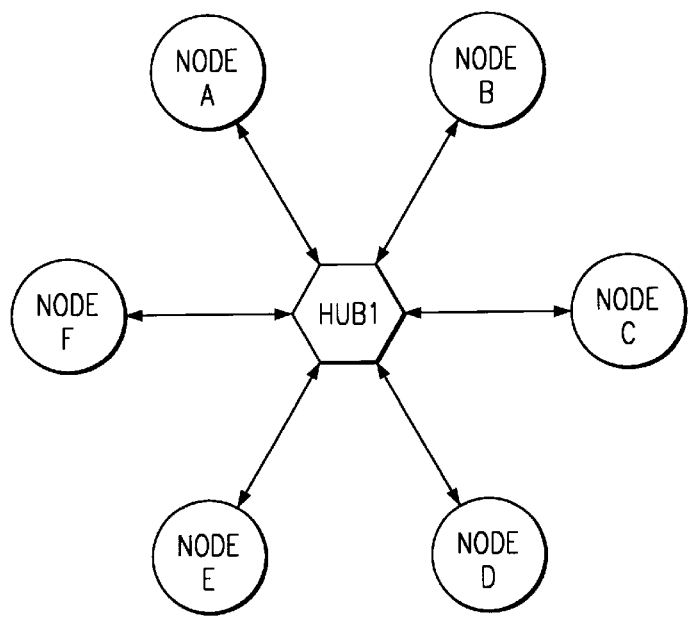
FIG. 3 shows a block diagram of a network of computer system nodes.

FIG. 3 shows a block diagram of a computer network system according to the presently preferred embodiment. In this scenario, a central six-port hub HUB 1 connects a small network of six nodes, NODES A-F, each node comprising either a computer system or perhaps even a network server. According to the preferred embodiment, each computer node implements the claimed method.

Particular Advantages of the Preferred Embodiment

In Embodiments where all of the hardware privileges and authentication mechanisms are performed by the server operating system, the administrator does not have to maintain a separate database of user credentials for the OS and for the hardware. Also, when the network credentials (privileges, password, etc.) change. the hardware credentials change at the same time. This significantly simplifies the administrator's work and provides for additional system security.

For example, when a user on a conventional system quits, the administrator must both disable the network account and also go to the user's system and prevent the former user from accessing it through a power-on password. According to the disclosed embodiments, however, when the administrator disables the user account, the hardware is locked at the same time. Also, the administrator can prevent the user from logging into any other system without having to do anything else.

In the future, a single sign-on mechanism can be provided because the user already authenticated him/herself when he logged into his hardware. For example, since the user has already provided username and password information, which was validated by the network server, in order to use the node system, the network can use this same information to log the user onto the network.

Further, the preferred embodiment can render a computer system useless unless it resides on a specified network domain. Therefore, even if a computer system is stolen and placed in another network environment, unless the domain ID is authenticated properly it will not work.

According to one disclosed class of innovative embodiments, there is provided a computer network, comprising: a plurality of computer systems, each having a memory, a microprocessor operatively connected to read and write said memory, a graphics controller operatively connected to said microprocessor, a video display connected to said graphics controller; a local storage device storing applications to be executed; an authorization server, having a unique server identifier and operable to verify user logon information; wherein when one of said systems is powered on, said system checks said unique server identifier and selectively disables said system if said identifier does not match a predetermined set of acceptable identifiers.

According to another disclosed class of innovative embodiments, there is provided a computer network, comprising: a plurality of computer systems, each having a memory, a microprocessor operatively connected to read and write said memory, a graphics controller operatively connected to said microprocessor, a video display connected to said graphics controller; a local storage device storing applications to be executed; wherein each of said systems checks said user logon information with an authorization server, and said system is selectively disabled if said logon information identifier does not match a predetermined set of acceptable logon information.

According to another disclosed class of innovative embodiments, there is provided a computer network, comprising: a plurality of computer systems, each having a memory, a microprocessor operatively connected to read and write said memory, a graphics controller connected to said microprocessor, a local storage device storing applications to be executed; a video display connected to said graphics controller; an authentication circuit operatively connected to disable said computer system; an authorization server, having a unique server identifier and operable to verify user logon information; wherein when one of said computer systems is powered on, at least one of the following occurs: said one of said computer systems requests said security identifier from said authorization server and selectively disables said system according to the results of said request; and said one of said computer systems verifies said logon information with said authorization server, and said authentication circuit selectively disables said system according to said verification.

According to another disclosed class of innovative embodiments, there is provided a computer system, comprising: a memory, a microprocessor operatively connected to read and write said memory, a graphics controller operatively connected to said microprocessor, a video display connected to said graphics controller; a local storage device storing applications to be executed; wherein said system is powered on, said system checks a server identifier of a computer network and selectively disables said system if said identifier does not match a predetermined set of acceptable identifiers.

According to another disclosed class of innovative embodiments, there is provided a computer system, comprising: a memory, a microprocessor operatively connected to read and write said memory, a graphics controller operatively connected to said microprocessor, a video display connected to said graphics controller; a local storage device storing applications to be executed; wherein said system requires users to enter user logon information when said system is started; and wherein said systems checks said user logon information with a network authorization server, and said system is selectively disabled if said logon information identifier does not match a predetermined set of acceptable logon information.

According to another disclosed class of innovative embodiments, there is provided a method, comprising the steps of starting a computer system and executing a power-on-self-test; determining if said computer system is connected to a computer network, and disabling said computer system is it is not; transmitting to an authorization server, by said computer system, a request for a network identifier; receiving said network identifier from said authorization server; verifying said network identifier and disabling said computer system if said verification fails; transmitting user logon information by said computer system to said authorization server; receiving user authorization from said authorization server and selectively disabling said computer system according to said authorization; executing an application program on said computer system.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

In alternate environments, a specific system, e.g. a portable computer, may be programmed to recognize any one of several authorized computer networks, and those networks may me configured to recognize the user's name and password. This is particularly advantageous, e.g. when a user in a large corporation needs the ability to connect to networks at several sites, but desires to maintain the security of his system.

In the sample computer system embodiment the user input devices can alternatively include a trackball, a joystick, a 3D position sensor, voice recognition inputs, or other inputs. Similarly, the output devices can optionally include speakers, a display (or merely a display driver), a modem, or other outputs.

What is claimed is:

1. A computer network, comprising:
a plurality of computer systems, each having
a memory,
a microprocessor operatively connected to read and write said memory,
a graphics controller operatively connected to said microprocessor,
a video display connected to said graphics controller;
a local storage device storing applications to be executed;
an authorization server, having a unique server identifier and operable to verify user logon information;
wherein when one of said systems is powered on, said system checks said unique server identifier and selectively disables said system if said identifier does not match a predetermined set of acceptable identifiers.

2. The computer network of claim 1, further comprising an authentication circuit operatively connected to disable said computer system.

3. The computer network of claim 1, wherein said authorization server resides in the operating system of a network server.

4. The computer network of claim 1, wherein said authorization server resides in a stand-alone utility on a network server.

5. The computer network of claim 1, wherein said system is disabled by disabling said microprocessor of said system.

6. The computer network of claim 1, wherein said system is disabled by disabling a system motherboard of said system.

7. A computer network, comprising:
a plurality of computer systems, each having
a memory,
a microprocessor operatively connected to read and write said memory,
a graphics controller connected to said microprocessor,
a local storage device storing applications to be executed;
a video display connected to said graphics controller;
an authentication circuit operatively connected to disable said computer system;
an authorization server, having a unique server identifier and operable to verify user logon information;
wherein when one of said computer systems is powered on, both of the following occur:
said one of said computer systems requests said security identifier from said authorization server and selectively disables said system according to the results of said request; and
said one of said computer systems verifies said logon information with said authorization server, and said authentication circuit selectively disables said system according to said verification.

8. The computer network of claim 7, wherein said authentication circuit comprises unerasable floating-gate memory cells.

9. The computer network of claim 7, wherein if said user logon information identifies an administrator for one of said computer systems, said user logon information identifies an administrator for all said computer systems.

10. The computer network of claim 7, wherein said authorization server resides in the operating system of a network server.

11. The computer network of claim 7, wherein said authorization server resides in a stand-alone utility on a network server.

12. The computer network of claim 7, wherein said user logon information consists of a username and a password.

13. The computer network of claim 7, wherein said system is disabled by disabling said microprocessor of said system.

14. The computer network of claim 7, wherein said system is disabled by disabling a system motherboard of said system.

15. A computer system, comprising:
a memory,
a microprocessor operatively connected to read and write said memory,
a graphics controller operatively connected to said microprocessor,
a video display connected to said graphics controller;
a local storage device storing applications to be executed;
wherein said system is powered on, said system checks a server identifier of a computer network and selectively disables said system if said identifier does not match a predetermined set of acceptable identifiers.

16. The computer system of claim 15, wherein after starting said computer system, no application may be executed until said server identifier is checked.

17. The computer system of claim 15, wherein after a reset of said computer system, no application may be executed until said server identifier is checked.

18. The computer system of claim 15, further comprising an authentication circuit operatively connected to disable said computer system.

19. The computer system of claim 15, wherein said system is disabled by disabling said microprocessor of said system.

20. The computer system of claim 15, wherein said system is disabled by disabling a system motherboard of said system.

21. A method, comprising the steps of:
(a.) starting a computer system and executing a power-on-self-test;
(b.) determining if said computer system is connected to a computer network, and disabling said computer system is it is not;
(c.) transmitting to an authorization server, by said computer system, a request for a network identifier;
(d.) receiving said network identifier from said authorization server;
(e.) verifying said network identifier and disabling said computer system if said verification fails;
(f.) transmitting user logon information by said computer system to said authorization server;
(g.) receiving user authorization from said authorization server and selectively disabling said computer system according to said authorization; and
(h.) executing an application program on said computer system.

22. The method of claim 21, wherein said authorization server resides in the operating system of a network server.

23. The method of claim 21, wherein said authorization server resides in a stand-alone utility on a network server.

24. The method of claim 21, wherein said user logon information consists of a username and a password.

* * * * *

UNITED STATES PATENT AND TRADEMARK OFFICE
CERTIFICATE OF CORRECTION

PATENT NO. : 6,125,457
DATED : September 26, 2000
INVENTOR(S) : Adrian Crisan and Brant W. Jones It is certified that error appears in the above-identified patent and that said Letters Patent is hereby corrected as shown below:

Column 10,
Line 32, change the first occurrence of "is" to -- if --.

Signed and Sealed this

First Day of January, 2002

Attest:

Attesting Officer

JAMES E. ROGAN
*Director of the United States Patent and Trademark Office*